United States Patent
Woodhead et al.

(10) Patent No.: US 10,782,730 B2
(45) Date of Patent: *Sep. 22, 2020

(54) SYNCHRONISATION OF HARDWARE CLOCK USING SOFTWARE CLOCK SYNCHRONISATION ERROR

(71) Applicant: Imagination Technologies Limited, Kings Langley (GB)

(72) Inventors: Martin Woodhead, Chepstow (GB); Arnold Mark Bilstad, Los Altos, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,285

(22) Filed: Jun. 5, 2019

(65) Prior Publication Data

US 2019/0286188 A1 Sep. 19, 2019

Related U.S. Application Data

(63) Continuation of application No. 15/638,504, filed on Jun. 30, 2017, now Pat. No. 10,353,424.

(60) Provisional application No. 62/357,499, filed on Jul. 1, 2016.

(51) Int. Cl.
| | | |
|---|---|---|
| *G06F 1/12* | (2006.01) |
| *G06F 1/08* | (2006.01) |
| *H04N 21/43* | (2011.01) |
| *H04N 21/8547* | (2011.01) |
| *H04N 21/242* | (2011.01) |
| *H04N 21/439* | (2011.01) |
| *G11B 27/19* | (2006.01) |

(52) U.S. Cl.
CPC .................. *G06F 1/12* (2013.01); *G06F 1/08* (2013.01); *H04N 21/4307* (2013.01); *H04N 21/8547* (2013.01); *G11B 27/19* (2013.01); *H04N 21/242* (2013.01); *H04N 21/4398* (2013.01)

(58) Field of Classification Search
CPC ......... G06F 1/12; G06F 1/08; H04N 21/4307; H04N 21/8547; H04N 21/242; H04N 21/4398; G11B 27/19
See application file for complete search history.

(56) References Cited

U.S. PATENT DOCUMENTS

| | | | | |
|---|---|---|---|---|
| 5,818,847 A * | 10/1998 | Zak | .................. | G06F 11/076 714/704 |
| 7,519,845 B2 * | 4/2009 | Chen | ................. | H04N 21/4305 713/500 |
| 7,711,535 B1 | 5/2010 | Brookes et al. | | |
| 8,713,346 B2 * | 4/2014 | Wagner | .................... | G06F 1/14 713/500 |

(Continued)

*Primary Examiner* — Thomas J. Hiltunen
(74) *Attorney, Agent, or Firm* — Potomac Law Group, PLLC; Vincent M DeLuca

(57) ABSTRACT

A first device operates synchronously with a second device, and includes a hardware clock having an adjustable clock frequency and a software clock configured to derive time in dependence on the hardware clock. A controller determines a synchronisation error between the software clock and a clock of the second device, and adjusts the clock frequency of the hardware clock in dependence on the synchronisation error so as to synchronise the hardware clock to a hardware clock of the second device.

20 Claims, 4 Drawing Sheets

(56) References Cited

U.S. PATENT DOCUMENTS

| | | |
|---|---|---|
| 9,294,999 B2 * | 3/2016 | Mueller-Weinfurtner .................... H04W 52/029 |
| 10,165,534 B2 | 12/2018 | Bilstad et al. |
| 10,353,424 B2 * | 7/2019 | Woodhead ................ G06F 1/12 |
| 2004/0187043 A1 | 9/2004 | Swenson et al. |
| 2005/0180466 A1 | 8/2005 | Franchuk et al. |
| 2005/0234571 A1 | 10/2005 | Holmes |
| 2006/0280182 A1 | 12/2006 | Williams et al. |
| 2008/0301335 A1 | 12/2008 | Yeh et al. |
| 2011/0150005 A1 | 6/2011 | Chen et al. |
| 2013/0121347 A1 | 5/2013 | Saito et al. |
| 2014/0064303 A1 | 3/2014 | Aweya et al. |
| 2015/0090000 A1 | 4/2015 | Ediger et al. |
| 2015/0163000 A1 | 6/2015 | Aweya |
| 2017/0019748 A1 | 1/2017 | Cheon et al. |
| 2017/0099634 A1 * | 4/2017 | Garudadri .............. G01D 21/00 |
| 2018/0007647 A1 | 1/2018 | Bilstad et al. |
| 2018/0059745 A1 * | 3/2018 | Gross ...................... G06F 1/206 |

\* cited by examiner

SYNCHRONISATION OF HARDWARE CLOCK USING SOFTWARE CLOCK SYNCHRONISATION ERROR

CROSS-REFERENCE TO RELATED APPLICATIONS AND CLAIM OF PRIORITY

This application is a continuation under 35 U.S.C. 120 of copending application Ser. No. 15/638,504 filed Jun. 30, 2017, which claims priority under 35 U.S.C. 119(e) from provisional Application Ser. No. 62/357,499 filed Jul. 1, 2016.

BACKGROUND

This invention relates to synchronising clocks.

Time synchronisation in computer and communication systems is important for performing time-sensitive tasks. A lack of synchronisation between devices may lead to various problems. For example, in a wireless media system, a lack of synchronisation between different media playout devices (e.g. speakers) in the system may cause playback of the media to be out-of-sync. Other time-sensitive tasks where accurate synchronisation is critical include synchronising times for communicating (e.g. in time division multiple access communication systems), accurate time-stamping (e.g. for high-frequency trading), timing for global navigation satellite systems, etc.

A lack of synchronisation between devices may be caused by slight differences between the clocks running at those devices. Even when clocks are initially set accurately, they will differ after some amount of time due to clock drift, which may be caused by, for example, the clocks counting time at slightly different rates, environmental factors such as temperature differences, relativistic effects, etc. There is, therefore, a need to synchronise the clocks at different devices and maintain synchronisation over time.

SUMMARY

According to a first aspect there is provided a first device for playing media synchronously with a second device, the first device comprising:
  a hardware clock having an adjustable clock frequency;
  a software clock configured to derive time in dependence on the hardware clock;
  a controller configured to:
    determine a synchronisation error between the software clock and a clock of the second device; and
    adjust the clock frequency of the hardware clock in dependence on the synchronisation error; and
  a media playout device for playing media and configured to be clocked by the hardware clock.

The media playout device may be configured to convert a digital representation of the media to an analogue representation in dependence on the hardware clock.

The media playout device may be configured to play the media at a time according to the hardware clock.

The controller may be further configured to adjust the software clock in dependence on the determined synchronisation error.

The first device may further comprise a communications interface configured to receive a message comprising an indication of time according to the clock of the second device, wherein the controller is configured to determine the synchronisation error in dependence on the indication of time according to the clock of the second device and a time according to the software clock.

The software clock may operate at a first timescale and the hardware clock operates at a second timescale that is different to the first timescale.

The clock of the second device may operate at the first timescale.

The communications interface may be further configured to receive a media playout time from the second device, the media playout time being provided in the timescale of the software clock; the first device further comprising:
  a playout device driver configured to estimate a hardware clock value corresponding to the playout time, wherein the media playout device is configured to play media when the hardware clock ticks to the estimated clock value.

The clock of the second device may be a second software clock configured to derive time in dependence on a second hardware clock of the second device, the clock frequency of the hardware clock of the first device being adjusted so as to synchronise the hardware clock of the first device to the second hardware clock of the second device.

The hardware clock may comprise a fractional phase-locked loop (PLL).

The hardware clock may further comprise a counter clocked by the fractional PLL.

The synchronisation error may be a time difference between the software clock and the clock of the second device and wherein the controller is configured to provide the time difference to a proportional-integral (PI) controller so as to estimate a frequency difference, the hardware clock being adjusted in dependence on the estimated frequency difference.

The first device may be a wireless speaker.

According to a second aspect there is provided a first device as claimed in any preceding claim, wherein the controller is configured to determine the synchronisation error by:
  receiving a first message comprising an identifier;
  generating a first timestamp in dependence on a time at which the first message is received at the first device according to the software clock;
  receiving a second message from the second device comprising the identifier and a second timestamp having been generated in dependence on a time at which the second device transmitted or received the first message according to the clock of the second device; and
  estimating the synchronisation error in dependence on a time difference between a time indicated by the first timestamp and a time indicated by the second timestamp.

The first device may be configured to operate according to a WLAN standard.

The media playout device may comprise a first digital-to-analogue converter configured to convert a first digital representation of the media to an analogue representation for playing based upon the hardware clock.

According to a third aspect there is provided a method, at a first device, for playing media in synchronisation with a second device, wherein the first device comprises a hardware clock having an adjustable clock frequency, a media playout device and a software clock configured to derive time in dependence on the hardware clock, the method comprising:
  determining a synchronisation error between the software clock and a clock of the second device;

adjusting the clock frequency of the hardware clock in dependence on the synchronisation error; and playing media at the media playout device configured to be clocked by the hardware clock.

The method may further comprise, at the media playout device, converting a digital representation of the media to an analogue representation in dependence on the hardware clock.

The method may further comprise playing, at the media playout device, the media at a time according to the hardware clock.

The method may further comprise adjusting the software clock in dependence on the determined synchronisation error.

The method may further comprise:
receive a message comprising an indication of time according to the clock of the second device, wherein the synchronisation error is determined in dependence on the indication of time according the clock of the second device and a time according to the software clock.

The software clock may operate at a first timescale and the hardware clock operates at a second timescale that is different to the first timescale.

The clock of the second device may operate at the first timescale.

The method may further comprise:
receiving a media playout time from the device of the second device, the media playout time being provided in the timescale of the software clock; and
estimating a hardware clock value corresponding to the playout time, wherein the play step comprises playing media when the hardware clock ticks to the estimated clock value.

The clock of the second device may be a second software clock configured to derive time in dependence on a second hardware clock of the second device, the clock frequency of the hardware clock of the first device being adjusted so as to synchronise the hardware clock of the first device to the second hardware clock of the second device.

The hardware clock may comprise a fractional phase-locked loop (PLL).

The hardware clock may further comprise a counter clocked by the fractional PLL.

The synchronisation error may be a time difference between the software clock and the clock of the second device and wherein the method further comprises providing the time difference to a proportional-integral (PI) controller so as to estimate a frequency difference, the hardware clock being adjusted in dependence on the estimated frequency difference.

The first device may be a wireless speaker.

The determining step may comprise:
receiving a first message comprising an identifier;
generating a first timestamp in dependence on a time at which the first message is received at the first device according to the software clock;
receiving a second message from the second device comprising the identifier and a second timestamp having been generated in dependence on a time at which the second device transmitted or received the first message according to the clock of the second device; and
estimating the synchronisation error in dependence on a time difference between a time indicated by the first timestamp and a time indicated by the second timestamp.

The first device may be configured to operate according to a WLAN standard.

The media playout device may comprise a first digital-to-analogue converter configured to convert a first digital representation of the media to an analogue representation for playing based upon the hardware clock.

According to a fourth aspect there is provided a media system comprising:
a first device comprising a first hardware clock and a first software clock configured to derive time in dependence on the first hardware clock; and
a second device comprising a second hardware clock and a second software clock configured to derive time in dependence on the second hardware clock,
the second device being configured to adjust the second hardware clock so as to synchronise the second hardware clock to the first hardware clock in dependence on a synchronisation error between the first software clock and the second software clock.

The first device may comprise a first media playout device for playing media and configured be clocked by the first hardware clock; the second device may comprise a second media playout device for playing media and configured to be clocked by the second hardware clock; and the first and second media playout devices may be configured to play media in synchronisation in dependence on the first and second hardware clocks respectively.

The first media playout device may comprise a first digital-to-analogue converter configured to convert a first digital representation of the media to an analogue representation in dependence on the first hardware clock; and the second media playout device may comprise a second digital-to-analogue converter configured to convert a second digital representation of the media to an analogue representation in dependence on the second hardware clock.

The first device may be configured to: generate a playout time for playing media, the playout time being in a timescale of the first and second software clocks; and send the playout time to the second device, wherein the second device is configured to: estimate a second hardware clock value corresponding to the playout time; and play media when the second hardware clock ticks to the estimated clock value.

The first device may be embodied in hardware on an integrated circuit.

According to a fifth aspect there is provided a method of manufacturing the first device at an integrated circuit manufacturing system.

According to a sixth aspect there is provided a non-transitory computer readable storage medium having stored thereon a computer readable description of an integrated circuit that, when processed in an integrated circuit manufacturing system, causes the integrated circuit manufacturing system to manufacture the first device.

According to a seventh aspect there is provided an integrated circuit manufacturing system comprising:
a non-transitory computer readable storage medium having stored thereon a computer readable integrated circuit description that describes the first device;
a layout processing system configured to process the integrated circuit description so as to generate a circuit layout description of an integrated circuit embodying the first device; and
an integrated circuit generation system configured to manufacture the first device according to the circuit layout description.

According to an eighth aspect there is provided a non-transitory computer readable storage medium having stored thereon computer readable instructions that, when executed at a computer system, cause the computer system to perform a method as described herein.

BRIEF DESCRIPTION OF THE DRAWINGS

The present invention will now be described by way of example with reference to the accompanying drawings. In the drawings.

DETAILED DESCRIPTION

Figure 1:
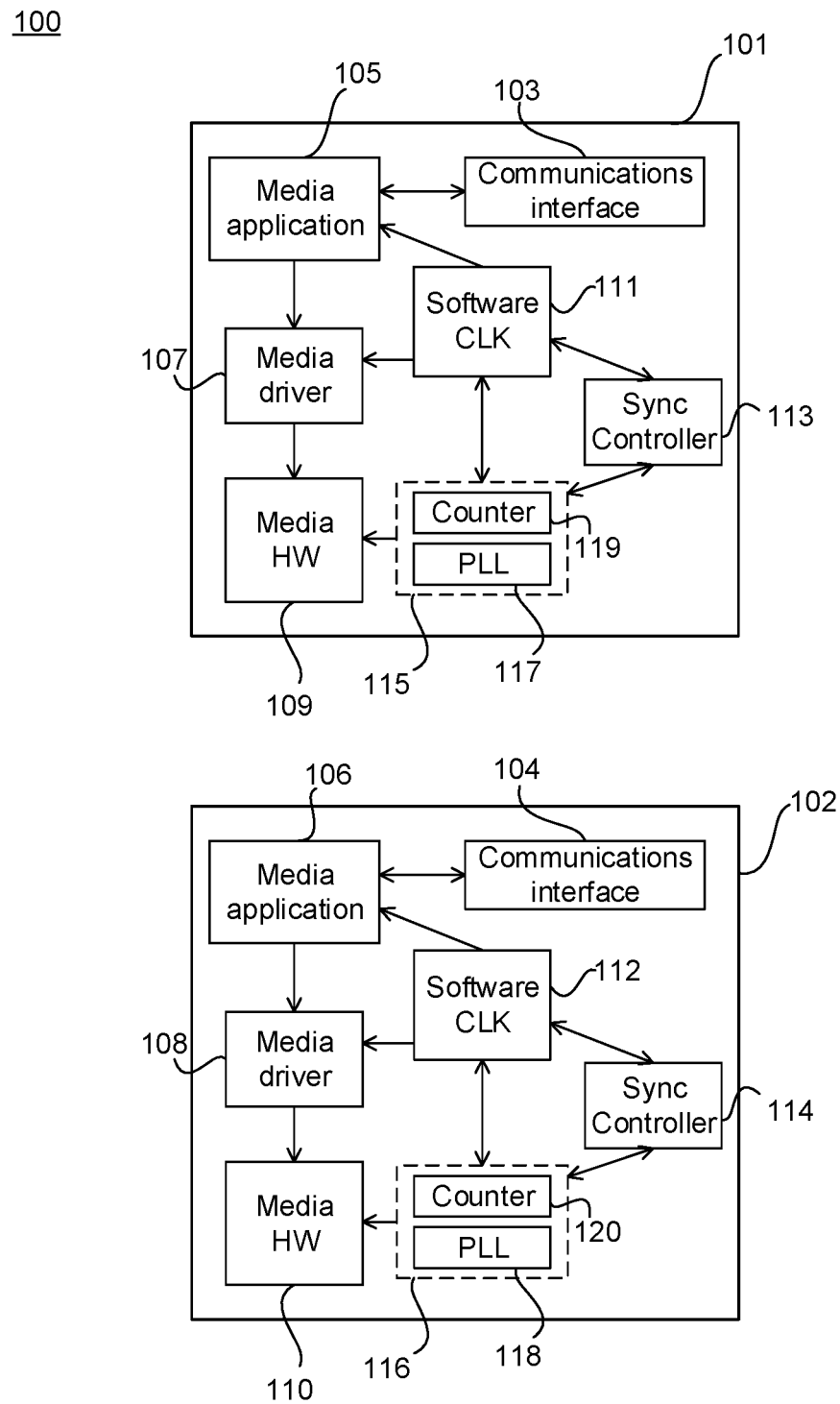
FIG. 1 shows an example of a media system.

The following description is presented by way of example to enable a person skilled in the art to make and use the invention. The present invention is not limited to the embodiments described herein and various modifications to the disclosed embodiments will be apparent to those skilled in the art.

The term "Wi-Fi network" is used herein to mean a wireless local area network (WLAN) that is based on the Institute of Electrical and Electronics Engineers (IEEE) 802.11 standards. The term "Wi-Fi station" (STA) is used herein to mean an electronic device that has a Wi-Fi module that allows the device to exchange data wirelessly using the IEEE 802.11 standards. The term "Wi-Fi access point" (AP) is used herein to mean an electronic device that acts as a central transmitter and receiver of W-Fi signals as set out in the IEEE 802.11 standards.

The methods, devices and systems are described herein as being implemented in a Wi-Fi network. It will be appreciated, however, that the methods, devices and systems may also be implemented using other wired or wireless communications networks, such as Bluetooth, Ethernet, USB, Zigbee, LTE, I2S, S/PDIF, etc.

The present disclosure relates to synchronising devices. For example, a device may need to be synchronised with one or more other devices so that a specified event can occur at those devices at the same time. In another example, the clocks at different devices may need to be synchronised so that they run or "tick" at the same rate. The examples described herein relate to synchronising media devices so that media (e.g. audio, video, etc) can be played out at the same time and at the same rate at each of the media devices. It will be appreciated that the synchronisation method described in relation to the media devices may be applied to other types of devices (e.g. computers, communications devices, positioning devices, etc) for performing other time-critical tasks.

Conventionally, the playback of media at media devices is controlled by a software clock (usually an operating system software clock). In media systems comprising media devices that are to play media in synchronisation, the devices may be arranged to start playback at a specific time, with the rate of playback being determined by the respective software clock. However, this relies on the software clocks at those devices being synchronised with each other and differences in the time and tick rates of those clocks can cause the media to be played out-of-sync. One conventional method of synchronising the software clocks of each device is to use a time synchronisation protocol such as Network Time Protocol (NTP). With NTP, each station periodically polls a time server accessible over the internet (typically an atomic clock server). This returns a time value, and the NTP can use this in combination with other measured network statistics to predict a "real" time value. However, there are problems with using an NTP-based solution in a wireless environment such as Wi-Fi which has asymmetric receive and transmit paths that can result in an inaccurate time predictions being applied and hence the software clocks in each device will not be adequately synchronised. This leads to the media devices playing out media at different times and different rates.

FIG. 1 depicts a media system 100 comprising media devices 101 and 102. Each of the media devices 101 and 102 comprise a communications interface 103 and 104 respectively for communicating data. In this Wi-Fi example, the communications interfaces 103 and 104 operate according to a Wi-Fi standard. However, as mentioned above, the system could be implemented on other communications networks and so the interfaces could be other suitable types of wired or wireless communications interface such as Bluetooth, Ethernet, USB, Zigbee, LTE, I2S, S/PDIF, etc.

Media devices 101 and 102 could be, for example, wireless speakers for synchronously playing audio. In other examples, the media devices 101 and 102 could be other types of devices such as displays, computers, smartphones, TVs, Hi-Fis, smart watches, smart glasses, augmented/virtual reality headsets, etc that are capable of outputting media such as audio and/or video.

Each of the devices 101 and 102 may comprise a media application 105 and 106 respectively, a media driver 107 and 108 respectively and media hardware (HW) 109 and 110 respectively. In the example of devices 101 and 102 being wireless speakers, the media HW 109 and 110 are speakers. The media HW 109 and 110 could be other types of media output devices such as displays, lights, etc or output ports connected to such devices.

Media applications 105 and 106 may receive media data from, e.g., a local storage device (not shown) or communications interface 103 and 104 respectively. The media applications 105 and 106 may control which media is to be played out and when. The applications 105 and 106 may process the media data so that it is suitable for further processing by media drivers 107 and 108 respectively. Applications 105 and 106 send the media data to drivers 107 and 108 respectively.

Each device 101 and 102 comprises a software clock 111 and 112 respectively that provides timing for media applications 105 and 106 respectively. One of the devices 101 or 102 may be selected to be a master device which other, slave, device synchronises to. In this example, device 101 is a master device and device 102 is a slave device that synchronises to master device 101. In the example of FIG. 1, software clock 112 of slave device 102 is to be synchronised with software clock 111 of master device 101.

The master device 101 may be the device in system 100 that also controls the performance of time-critical tasks, such as determining which media is to be played out by which device and a specified time for playing out that media. For example, the media application 105 of master device 101 may provide media to the media application 106 of the slave device 102 (e.g., via communications interfaces 103 and 104) for playback. Media application 105 of the master device 101 may also determine a time for both devices 101 and 102 to play the media. The determined time may also be sent to the media application 106 of the slave device 102. The determined time may be a presentation timestamp (PTS), which is a time according to software clock 111 that the media is to be played out by both devices 101 and 102.

Each device 101 and 102 comprises a synchronisation controller 113 and 114 respectively for synchronising software clocks 111 and 112 and maintaining their synchronisation. As device 101 is the master device, software clock 111 may run freely without making any adjustments to it while software clock 112 of slave device 102 is adjusted so that it is synchronised with clock 111. In an example, the time provided by clocks 111 and 112 represents an absolute time (e.g. in nanoseconds). The epoch of the time may be undefined in the sense that it may bear no resemblance to recognised calendar epochs such as Coordinated Universal Time (UTC). The epoch may also change after the devices 101 and 102 have been power-cycled. For example, the time provided by clocks 111 and 112 may be implemented as the number of nanoseconds since the master device 101 was powered-up. In this case, all devices in the system 100 share the same timescale and epoch. An example of how the software clock 112 of slave device 102 can be synchronised with the software clock 111 of the master device 101 is described in the example below in relation to FIG. 2.

Each device 101 and 102 may comprise a hardware clock 115 and 116 respectively that can function as a root time source for its device. Software clocks 111 and 112 may use hardware clocks 115 and 116 respectively as a basis for measuring time. In other words, software clocks 111 and 112 may be clocked by hardware clocks 115 and 116 respectively. For example, the software clock may increment or tick every fixed number of n tick(s) of the hardware clock, where n is greater than or equal to 1.

Hardware clocks 115 and 116 may operate or tick at a clock frequency which is adjustable. In one example, hardware clocks 115 and 116 may be provided by an oscillator such as a phase-locked loop (PLL), which has a frequency that is adjustable. The PLL may be a fractional PLL. In one example, each hardware clock 115 and 116 is a variable-frequency oscillator and the output signal of the oscillator is provided to software clocks 111 and 112 respectively, e.g., via a software clock driver (not shown). In another example, and as depicted in FIG. 1, each of the hardware clocks 115 and 116 comprise a variable-frequency oscillator (a fractional PLL, in this example) 117 and 118 respectively and a counter 119 and 120 respectively. Each counter 119 and 120 may be clocked by fractional PLL 117 and 118 respectively and provides an output clock signal (e.g, via a software clock driver, not shown) to software clock 111 and 112 respectively. Each counter 119 and 120 may divide the frequency of the PLL 117 and 118 respectively by a fixed amount. For example, the counters 119 and 120 may divide the frequency of the signal from the PLLs 117 and 118 so that the output frequency of the counters 119 and 120 scale to clock units of software clocks 111 and 112. In this example, software clocks 111 and 112 increment by a single clock unit for every tick measured from the signal output by counters 119 and 120 respectively. In other examples, the software clocks 111 and 112 may increment by a single clock unit every set number of ticks greater than one measured from counters 119 and 120 respectively.

The media HW 109 and 110 may be clocked by hardware clocks 115 and 116 respectively. For example, media HW 109 and 110 may receive its clock signal directly from PLLs 117 and 118 respectively or from counters 119 and 120 respectively. The rate of playback of the media at media HW 109 and 110 is dependent on the clock signal provided from HW clocks 115 and 116 respectively. For example, the clock signal for HW clocks 115 to 116 may be used to provide timing for converting digital media samples into analogue signals for playing out.

Hardware clocks 115 and 116 may initially be set to operate at the same frequency so that the software clocks 111 and 112 respectively tick at the same rate. However, as mentioned above, various factors can lead to the hardware clocks 115 and 116 drifting over time, which can cause the clocks at devices 101 and 102 (both the software clocks 111 and 112 and the hardware clocks 115 and 116) to lose synchronisation.

Figure 2A:
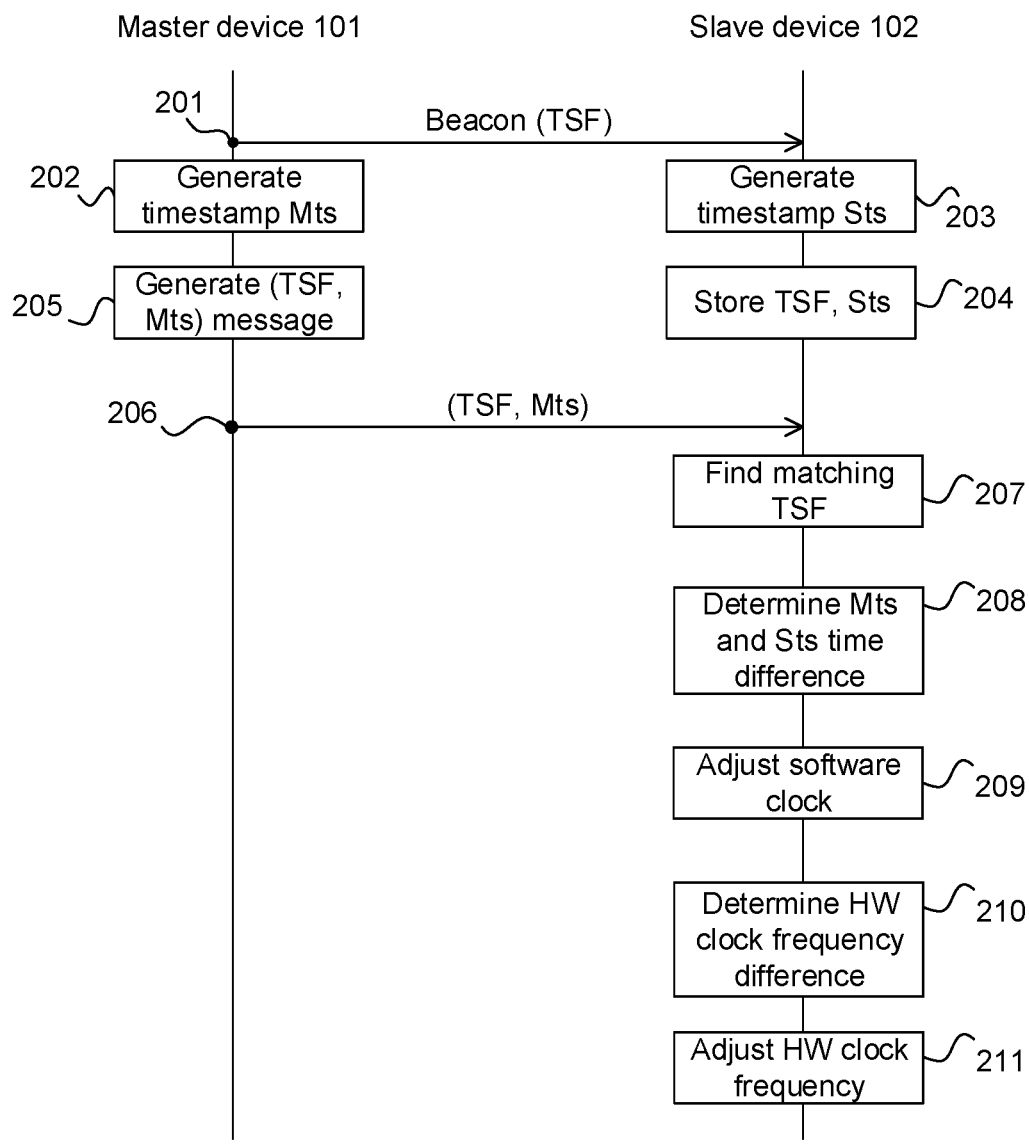
FIG. 2a illustrates a process for synchronising the clocks of the media system.

FIG. 2a depicts a process of synchronising the clocks at devices 101 and 102. The process is capable of synchronising both the software clocks 111 and 112 and the hardware clocks 115 and 116. In this example, communications interfaces 103 and 104 operate according to a Wi-Fi standard. The communications interfaces 103 and 104 may comprise physical layer clocks (not shown) to provide timing for Wi-Fi communications.

In this example, the master device 101 may also be the access point (AP) for the system or may be an STA that operates as a software enabled access point (softAP) when the system operates in a Wi-Fi Direct mode. When operating as a softAP, master device 101 can connect to another AP (not shown) to enable data to be sent to and from system 100. In this network arrangement, the communications interfaces 103 and 104 may establish a direct communications link with each other.

At 201, master device 101 transmits a message that comprises an identifier. In this example, master device 101 is an AP or is operating as a softAP and so the message may be a beacon message and the identifier may be a time synchronisation function (TSF) value which has been derived from the physical layer clock of the Wi-Fi communications interface 103. The beacon is periodically generated and broadcasted by the communications interface 103. In another example, the message may be any other message comprising an identifier (preferably, a unique identifier) that is transmitted by the master device 101 and receivable by the slave device 102. In a system that has multiple slave devices, the message may be a broadcast or multicast message that is receivable by all of the slave devices within direct communications range of the master device 101 at the same time.

At 202, the master device 101 generates a timestamp Mts indicating a time that the beacon was transmitted according to software clock 111. This timestamp Mts may be generated in a number of ways by the device 101. In one example, the communications interface 103 may comprise an application programming interface (API) that can access software clock 111 to determine the time when the beacon is transmitted according to that clock 111. The API may also determine the TSF value contained within that beacon. The API may then provide the determined time (timestamp Mts) and TSF value to synchronisation controller 113. In another example, the communications interface 103 may provide a copy of the beacon (or an indication that the beacon has been transmitted and the TSF value for the beacon) to the synchronisation controller 113 when the beacon has been transmitted. In response, the synchronisation controller 113 determines a time according to software clock 111. The determined time is the timestamp Mts that indicates the time that the master device 101 transmitted the beacon according to software clock 111.

The slave device 102 receives the beacon and, at 203, generates a timestamp Sts indicating a time that the beacon was received according to software clock 112. The timestamp Sts may be generated in a number of ways. For example, the communications interface 104 may comprise an application programming interface (API) that can access software clock 112 to determine the time when the beacon is received according to that clock 112. The API may also determine the TSF value contained within that beacon. The TSF API may then provide the determined time (timestamp Sts) and TSF value to synchronisation controller 114. In another example, the beacon (or an indication that the beacon has been received and the identifier) may be provided to the synchronisation controller 114 by the communications interface 104 when the beacon has been received. Beacon messages are required to be processed by STAs as a priority and so the beacon can be provided to the synchronisation controller 114 with minimal delay. In response to the beacon being received by the synchronisation controller 114, it determines a time according to software clock 112. The determined time is the timestamp Sts that indicates the time of receiving the beacon according to software clock 112.

The messages periodically broadcast by the master device 101 each contain a unique identifier so that each message can be distinguished from other broadcasted messages. In the example of broadcasting a beacon, the unique identifier may be a time synchronisation function (TSF). In the Wi-Fi standard, the TSF indicates a time on the physical layer clock of the AP, which the STAs are required to synchronise to at their own physical layer clocks. When an STA receives a beacon, it resets its own physical layer clock according to the TSF. As the beacons are generated periodically, the value of the TSF will be different for each beacon. Thus the TSF value can also function as a unique identifier for each beacon. The use of the TSF in this way as an identifier is not defined in the Wi-Fi standard. The physical layer clocks usually form part of the communications interface and may be different to software clocks 111 and 112 and hardware clocks 115 and 116.

The timestamp Sts for receiving the beacon and the TSF value contained within the beacon are stored in memory (not shown in FIG. 1) at the slave device 102, as indicated at 204.

At 205, the master device 101 generates a synchronisation message that comprises the TSF for the beacon transmitted at 201 and the timestamp Mts generated at 202. The synchronisation message is transmitted to the slave device 102, as shown at 206. In response to receiving the synchronisation message, the slave device 202 may acknowledge receipt (not shown in FIG. 2) of the synchronisation message to the master device 101. This allows the master device 101 to determine that the slave device 102 has successfully received the synchronisation message and allows it to presume that the clocks of the slave device 102 will be synchronised with the clocks of the master device 101.

In another network arrangement, the master and slave devices 101 and 102 may both be STAs and communicate via an AP. A Wi-Fi network operating in this way is sometimes referred to as an "infrastructure" mode of operation. In this arrangement, the AP broadcasts the beacon comprising the TSF and is received by both devices 101 and 102. The master device 101 generates timestamp Mts in response to receiving the beacon in a similar manner to slave device 102 at step 203 above. The master device 101 may then generate the synchronisation message as described above at step 205 but with the Mts indicating the time that the beacon was received at the master device 101 rather than the time it was transmitted. The master device 101 may then send the synchronisation message to the slave device 102 via the AP. The process in both network arrangements (Wi-Fi direct and infrastructure mode) may then continue in a similar manner and as described in the steps below.

The slave device 102 receives the synchronisation message. At 207, the synchronisation controller 114 analyses the message to determine the TSF value and the Mts timestamp value. The synchronisation controller 114 searches its memory to find a stored TSF value (which was the TSF value sent in the beacon at 201) that matches the TSF value in the received synchronisation message. At 208, when the matching TSF value has been found, the synchronisation controller 114 determines the difference in time between the received timestamp Mts and the stored timestamp Sts associated with the matching stored TSF. This difference in time may be considered to be the synchronisation error between the software clocks 111 and 112.

At 209, the synchronisation controller 114 adjusts the time on software clock 112 in dependence on the synchronisation error so that software clock 112 is synchronised with software clock 111. For example, if the Sts value was ahead of the Mts value by 2 ns, the synchronisation error may be considered to be 2 ns and so the software clock 112 may be adjusted by reducing its time by 2 ns. This step may, instead, be performed after adjusting the HW clock frequency at step 211.

At 210, the synchronisation controller 114 determines a difference in the clock frequencies of hardware clocks 115 and 116 in dependence on the determined synchronisation error. In this example, hardware clocks 115 and 116 are implemented by fractional PLLs 117 and 118 and counter 119 and 120, which count at a fixed rate. The frequency difference Fd between the PLLs 117 and 118 is determined. The following example provides one way of estimating the frequency difference Fd. Other methods of estimating Fd may be used.

The time difference Td between the software clocks 111 and 112 (i.e. the synchronisation error) is determined from step 208. The amount of time elapsed P since the last time the software clocks 111 and 112 and/or hardware clocks 115 and 116 were synchronised is also determined. For example, this may be determined by storing the previously generated Sts timestamp and calculating the time difference between the previous Sts timestamp and the current Sts timestamp. If the frequency (i.e. number of ticks per second) of hardware clock 116 is F, then the frequency difference Fd between hardware clocks 115 and 116 may be estimated by:

$$Fd=(F*Td)/P$$

In another example, the frequency difference Fd may be estimated using a proportional-integral (PI) controller such as a PI loop filter. In this example, the difference Td in time between the current master software clock 111 time and current slave software clock 112 time (which may take into account an initial offset between the clocks and measurement noise) is continuously determined and inputted into the PI loop filter. The PI loop filter uses the current time difference and the output from the loop filter for the previously inputted time difference to output an estimate of the current difference in the frequency Fd between the master hardware clock 115 and the slave hardware clock 116. The outputted frequency difference Fd may be adjusted further depending on a maximum allowed change from the previous frequency adjustment.

At 211, the synchronisation controller 114 adjusts the clock frequency of hardware clock 116 in dependence on the determined frequency difference Fd so that the hardware clocks 115 and 116 have the same clock frequency. In this example, hardware clock 116 is implemented by a fractional PLL 118 and a counter 120 which counts at a fixed rate and so the frequency of the hardware clock 116 is adjusted by adjusting the frequency of the PLL. For example, if it is determined that software clock 112 is ahead of clock 111, then the frequency of hardware clock 116 is reduced by Fd and if software clock 112 is behind clock 111, then the frequency of hardware clock 116 is increased by Fd. As the clock frequencies of PLLs 118 and 119 have been adjusted to be the same and the counters 119 and 120 count at the same fixed rate, the clock signal provided to the software clocks 111 and 112 will increment at substantially the same rate. Thus, software clocks 111 and 112 will be synchronised and tick at substantially the same frequency.

In another example, the hardware clocks 115 and 116 may be provided by an oscillator which does not have an adjustable frequency but does include a counter which has an adjustable counting rate. Thus, in this implementation, rather than the frequencies of the hardware clock oscillators being adjusted to be the same, the counter at the slave device is adjusted so that the output signals from the counters at the master and slave devices 101 and 102 have substantially the same frequency.

In the example above, steps 201 to 209 describe one method of determining the synchronisation error and synchronising software clocks 111 and 112. However, other synchronisation processes may be used to determine the synchronisation error and to synchronise software clocks 111 and 112.

Figure 2B:
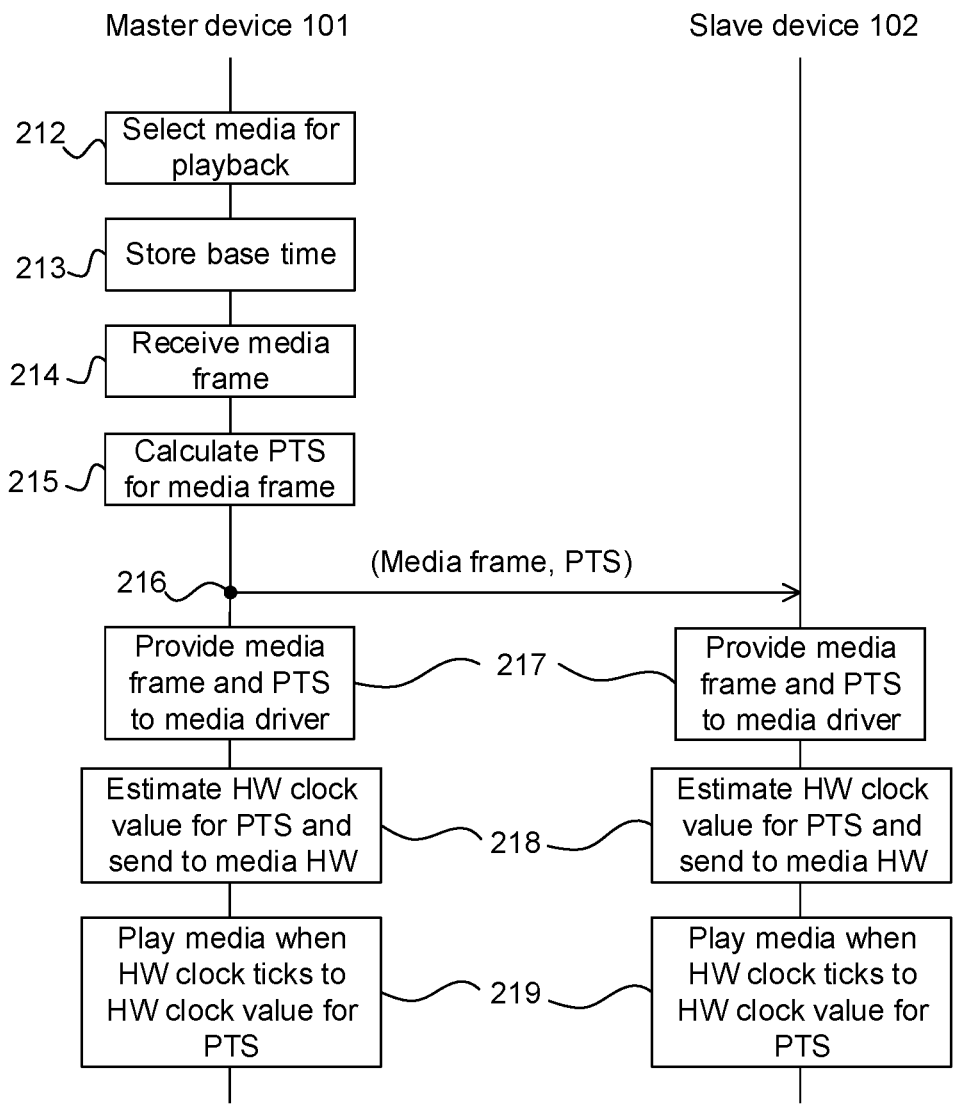
FIG. 2b illustrates a process for playing media at the media system.

FIG. 2b depicts a process for playing media in synchronisation at the master and slave devices 101 and 102. In this example, the media to be played out is a stream of media frames, which may have embedded timing information for each frame in the stream. The media stream may be a Real-time Transport Protocol (RTP) stream, for example.

At 212, media is selected for playing out at devices 101 and 102 in synchronisation. The media may be selected in response to, for example, a user input at the master device 101 or a remote device connected to the master device 101.

At 213, the master device media application 105 determines a current time according to software clock 110. The determined time may be an absolute time that is stored and used as a base time reference for the media playback.

At 214, a media frame is received by the media player 105 for playing locally and for sending to slave device 102 for playback at that device 102.

At 214, the media player 105 calculates a presentation timestamp (PTS), which is a time that the media frame, received at 214, is to be played out by the master and slave devices 101 and 102. The PTS may be calculated as follows:

$$PTS = base + reltime + delay$$

Where: "base" is the absolute base time according to software clock 111 determined at step 213; "reltime" is the relative time position of the media frame within the media stream; and "delay" is a time offset into the future to allow time for the media frame to be distributed to all of the slave devices in the network. The delay may be fixed or variable. For example, the delay may be variable and dependent on the number of slave devices in the network and/or the data transfer rate from the master device to the slave device, etc. For example, the delay may range from tens of milliseconds to a few seconds but could be shorter or longer depending on the implementation.

At 216, media application 105 at master device 101 sends the media frame and the PTS for that media frame to the media application 106 at slave device 102. In one example, the PTS may be inserted into the RTP stream as it is relayed to the slave device 102. This may involve inserting the PTS into the RTP packet(s) for the relevant frame. In another example, the PTS may be sent in separate packets to the media frames with an indicator as to which frame the PTS is for.

At 217, media applications 105 and 106 send the media frame and the PTS for that frame to media drivers 107 and 108 respectively. The drivers 107 and 108 prepare the media for playback by media HW 109 and 110 respectively.

As mentioned above, the media HW 109 and 110 may be clocked by hardware clocks 115 and 116 respectively. Thus, the timescale in which media HW 109 and 110 operate may be different to the timescale in which media applications 105 and 106 operate (which operate at the timescale of software clocks 111 and 112). Thus, at 218 media drivers 107 and 108 estimate a clock value in the timescale of the HW clocks 115 and 116 that corresponds to the PTS time. The drivers 107 and 108 then send the estimated HW clock values for the PTS and the media frame to be played back at that time to media HW 109 and 110 respectively.

At 219, the media HW 109 and 110 may then play back that media when the HW clocks 115 and 116 tick to their respective estimated HW clock values for the PTS value. The estimated values will correspond to substantially the same time and so the media can be played back in synchronisation at both devices 101 and 102.

Steps 214 to 219 may be repeated for each subsequent media frame in the media stream.

The media that is played out simultaneously by each device 101 and 102 may be different. The media application 105 of the master device 101 may provide a PTS value for a frame to be played out by the master device 101 and the same PTS value for a different frame to be sent to and played out by the slave device 102. For example, device 101 may play out frames for left channel audio whereas device 102 may playout frames for corresponding right channel audio. In another example, the master device 101 may be a display and the slave device 102 a speaker and the master 101 plays video frames and the slave 102 synchronously plays corresponding audio for that video.

Clocking the media HW 109 and 110 using HW clocks instead of software clocks provides the media HW with direct access to a timing source and thus eliminates any delays in having to obtain timing from a software clock at operating system or application level. This aids synchronisation between different devices as the processing capability or processing load at those devices may vary, leading to differing amounts of delay in providing timing information to the media HW, which can cause the devices to play out the media out-of-sync.

Media devices attempting to play media in synchronisation also need to play the media at the same rate. The media to be played at each media device may have a set sample rate (e.g. 44.1 kHz) at which the media samples are to be consumed. The rate at which the media HW consumes media samples for playback is driven by its clock. Differences in the frequency of the clocks driving the media HW at each device can lead to differences in the rate at which samples are processed, which can lead to the media being played back at different rates. In some systems, frequency discrepancies between clocks on different devices are compensated for by slave devices determining the difference in the clock frequencies between the slave device and a master device and performing resampling of the media data at the slave device in dependence of that difference prior to providing that media to a buffer in the media hardware.

As mentioned above, the frequency of HW clock 116 is adjusted to be the same as the frequency of HW clock 115. Thus media HW 109 and 110 at devices 101 and 102 respectively are clocked at the same frequency and therefore are capable of playing media at the same rate. For example, media HW 109 and 110 may comprise digital-to-analogue converters (DACs, not shown) for reconstructing digital media into analogue media for playback (e.g. converting digitised audio into an analogue signal for a speaker). The DACs require a clock signal to provide timing for this conversion. If the DACs at media HW 109 and 110 are clocked at different rates (and no resampling of the media is performed), the same media will be played out at different speeds. Clocking the media HW 109 and 110 (and their DACs) with HW clocks 115 and 116 allows the frequencies of those clocks to be adjusted to be substantially the same, which will allow digital media to be converted at the same rate and thus played out at the same rate. Furthermore, resampling of the media at one of the devices is not required as both media HW 109 and 110 are clocked at the same frequency.

The devices of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a device need not be physically generated by the device at any point and may merely represent logical values which conveniently describe the processing performed by the device between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a device configured to perform any of the methods described herein, or to manufacture a device comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a device will now be described with respect to FIG. 3.

Figure 3:
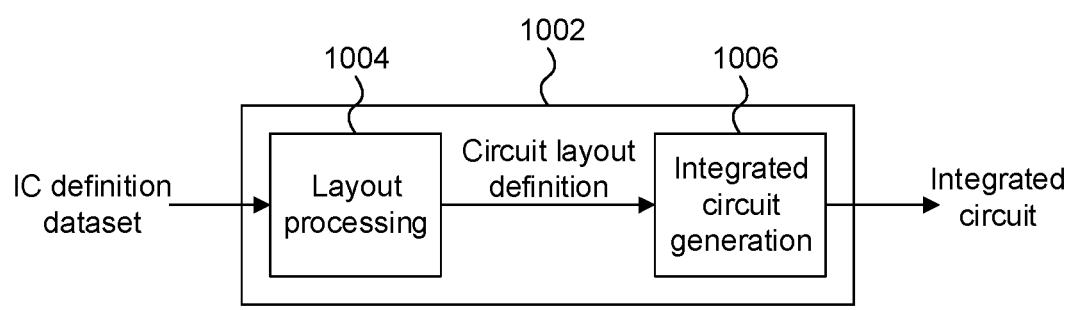
FIG. 3 is a schematic diagram of an integrated circuit manufacturing system.

FIG. 3 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a device as described in any of the examples herein), process the IC definition dataset, and generate an IC according to the IC definition dataset (e.g. which embodies a device as described in any of the examples herein). The processing of the IC definition dataset configures the IC manufacturing system 1002 to manufacture an integrated circuit embodying a device as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 3 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 3, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A non-transitory computer readable storage medium having stored thereon computer readable code that, when executed at a computer system, causes the computer system to:
   derive time for a software clock in dependence on a hardware clock;
   determine a synchronisation error between the software clock and a clock of a second device;
   adjust the clock frequency of the hardware clock in dependence on the synchronisation error; and
   control playout of media at a media playout device configured to be clocked by the hardware clock.

2. The non-transitory computer readable storage medium according to claim 1, wherein the computer readable code further causes the computer system to:
   at the media playout device, convert a digital representation of the media to an analogue representation in dependence on the hardware clock.

3. The non-transitory computer readable storage medium according to claim 1, wherein the computer readable code further causes the computer system to:
   at the media playout device, play the media at a time according to the hardware clock.

4. The non-transitory computer readable storage medium according to claim 1, wherein the computer readable code further causes the computer system to:
   adjust the software clock in dependence on the determined synchronisation error.

5. The non-transitory computer readable storage medium according to claim 1, wherein the software clock operates at a first timescale and the hardware clock operates at a second timescale that is different to the first timescale, the clock of the second device operating at the first timescale.

6. A first device for operating synchronously with a second device, the first device comprising:
   a hardware clock having an adjustable clock frequency;
   a software clock configured to derive time in dependence on the hardware clock; and
   a controller configured to:
      determine a synchronisation error between the software clock and a clock of the second device; and
   adjust the clock frequency of the hardware clock in dependence on the synchronisation error so as to synchronise the hardware clock to a hardware clock of the second device.

7. The first device as claimed in claim 6, wherein the controller is further configured to adjust the software clock in dependence on the determined synchronisation error.

8. The first device as claimed in claim 6, further comprising a communications interface configured to receive a message comprising an indication of time according to the clock of the second device, and wherein the controller is configured to determine the synchronisation error in dependence on the indication of time according to the clock of the second device and a time according to the software clock.

9. The first device as claimed in claim 6, wherein the software clock operates at a first timescale and the hardware clock operates at a second timescale that is different to the first timescale, the clock of the second device operating at the first timescale.

10. The first device as claimed in claim 6, wherein the clock of the second device is a second software clock configured to derive time in dependence on a second hardware clock of the second device, the clock frequency of the hardware clock of the first device being adjusted so as to synchronise the hardware clock of the first device to the second hardware clock of the second device.

11. The first device as claimed in claim 6, wherein the synchronisation error is a time difference between the software clock and the clock of the second device and wherein the controller is configured to provide the time difference to a proportional-integral (PI) controller so as to estimate a frequency difference, the hardware clock being adjusted in dependence on the estimated frequency difference.

12. The first device as claimed in claim 6, further comprising a media playout device for playing media and configured to be clocked by the hardware clock.

13. A device comprising:
a hardware clock; and
a software clock configured to derive time in dependence on the hardware clock,
the device being configured to adjust the hardware clock so as to synchronise the hardware clock to a further hardware clock in a further device in dependence on a synchronisation error between the software clock and a further software clock in the further device.

14. The device as claimed in claim 13, further comprising:
a media playout device for playing media, configured to be clocked by the hardware clock.

15. The device as claimed in claim 14, wherein the media playout device is configured to play media in synchronisation with the further device in dependence on the hardware clock.

16. The device as claimed in claim 14, wherein:
the media playout device comprises a digital-to-analogue converter configured to convert a digital representation of the media to an analogue representation in dependence on the hardware clock.

17. The device as claimed in claim 13, further comprising a communications interface configured to receive a message comprising an indication of time according to the further software clock of the further device, and wherein the device is configured to determine the synchronisation error in dependence on the indication of time according to the further software clock of the further device and a time according to the software clock.

18. The device as claimed in claim 13, wherein the software clock operates at a first timescale and the hardware clock operates at a second timescale that is different to the first timescale, the software clock of the further device operating at the first timescale.

19. The device as claimed in claim 17, wherein the communications interface is further configured to receive a media playout time from the further device, the media playout time being provided in the timescale of the software clock; the device further comprising:
a playout device driver configured to estimate a hardware clock value corresponding to the playout time, wherein the media playout device is configured to play media when the hardware clock ticks to the estimated clock value.

20. The device as claimed in claim 13, wherein the further software clock of the further device is configured to derive time in dependence on a further hardware clock of the further device, the clock frequency of the hardware clock of the first device being adjusted so as to synchronise the hardware clock of the first device to the further hardware clock of the further device.

* * * * *